Figure 1:
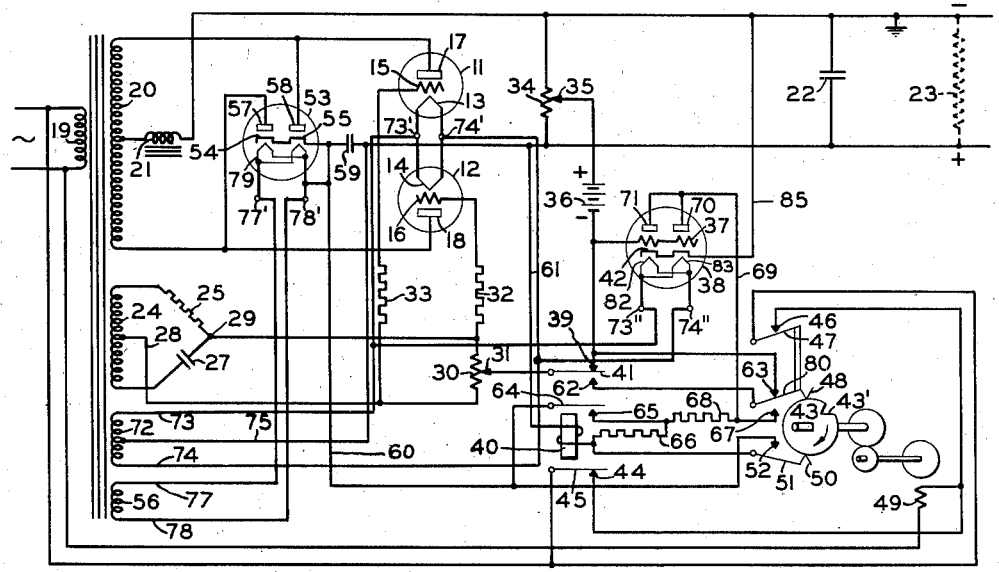

July 8, 1941.   M. L. HASELTON ET AL   2,248,821

RECTIFIER AND CONTROL MEANS THEREFOR

Filed Dec. 31, 1938

INVENTORS
M. L. HASELTON
H. F. MAY
BY
*N. F. Presson*
ATTORNEY

Patented July 8, 1941

2,248,821

UNITED STATES PATENT OFFICE 2,248,821

RECTIFIER AND CONTROL MEANS THEREFOR

Merton L. Haselton, Rye, and Harold F. May, Valley Stream, N. Y., assignors to Teleregister Corporation, New York, N. Y., a corporation of Delaware Application December 31, 1938, Serial No. 248,788

10 Claims. (Cl. 175—363)

This invention relates to improvements in rectifiers of the gaseous discharge type and means for controlling the ignition or starting time of such rectifiers.

Rectifier tubes of the gas-filled grid controlled type, such, for example, as those containing an inert gas or mercury vapor or the like, require means for controlling the ignition or starting time of the tubes. Various methods of control for such rectifiers have heretofore been employed, one of which methods is to impress on the grid or control element of the main rectifier tube an alternating potential of suitable magnitude and in fixed phase relation to the alternating potential applied to the rectifier anode circuit, and superimposing on said alternating potential impressed on the control element, a variable direct current controlling potential, whereby the ignition time of the tube may be adjusted or varied.

The control systems heretofore employed, however, including those of the character described, have not been found suitable for automatically maintaining the direct current output voltage of a rectifier at a predetermined constant value under conditions of wide and rapid fluctuations of load, such, for example, as a pulsating load varying from minimum to maximum many times per second.

When gas-filled grid controlled rectifiers are started from a cold condition, the arc concentrates at some spot on the cathode instead of impinging on the entire cathode surface, and this bombards the active material off the cathode, thus damaging the cathode and shortening the life thereof. Heretofore it has been proposed to prevent starting of the rectifier until the cathode was properly heated, by opening the path of the input power supply or the rectified output, but such arrangements have involved various disadvantages, such as the use of switching contacts of large potential or current carrying capacity with resultant arcing of the contacts and difficulty of maintenance of such circuits.

An object of the invention is a gas-filled grid controlled rectifier in which the direct current output voltage is automatically maintained at a predetermined and substantially constant value under conditions of wide and rapid fluctuations of load.

Another object of the invention is an improved automatic output voltage regulating means for rectifiers of the gaseous discharge type.

A further object is the provision of more suitable means for balancing the load between two or more rectifier tubes as, for example, the two tubes in a single phase full wave rectifier.

An additional object is to provide an improved starting means for automatically preventing the rectifier from conducting current until after the cathode has become completely heated.

Figure 2:
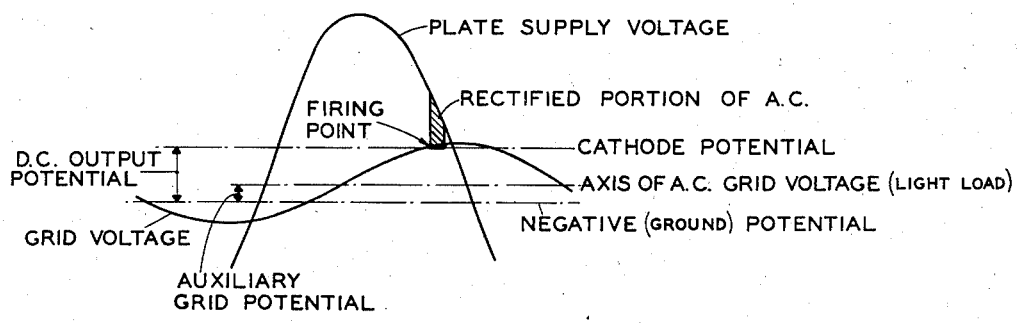
Figure 3:
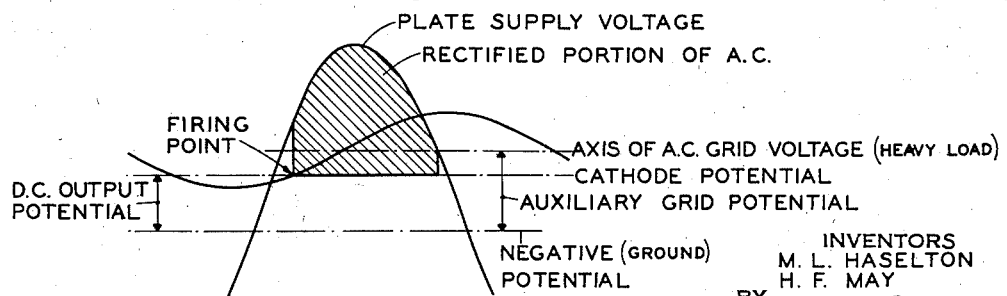

Various other features and advantages of the invention will be apparent from the following detailed description, taken in connection with the accompanying drawing, in which:

Fig. 1 shows a single phase full wave rectifier and control means therefor, embodying the principles of the invention; and Figs. 2 and 3 illustrate graphically the characteristics of various control voltages employed in the arrangement of Fig. 1.

Referring to Fig. 1, there is shown a single phase full wave grid controlled rectifier circuit having two half-wave rectifier tubes 11 and 12 with electron emitting cathodes 13 and 14, grids 15 and 16, and anodes or plates 17 and 18. The plate supply current for the rectifier is obtained from a source of alternating current connected to the primary winding 19 of the supply transformer, the secondary 20 of which is connected across the plates of the rectifier tubes. The secondary plate supply winding of the transformer is tapped at the center of winding 20 and this center tap is connected to a filter choke 21; the other end of the filter choke 21 is connected to one side of the filter condenser 22, and one side of a load 23. The load circuit is completed through the filament or cathode circuit of tubes 11 and 12, including the hot cathodes 13 and 14 connected across the secondary filament supply winding 72 of the main transformer. The winding 72 is preferably middle tapped for connection to the external load circuit, as shown, the conductors 73 and 74 from the winding 72 being connected at 73' and 74' to the two filaments or cathodes 13 and 14.

The above circuits comprise a single phase full wave rectifier of the conventional type, with the exception that the filter choke 21, ordinarily placed in the cathode circuit, has been placed in the anode plate circuit in order to avoid having the voltage drop across the choke appear in the grid control circuits of the tubes, as will be explained later. It is desirable, in order to secure relatively stable voltages under conditions of rapidly fluctuating loads to make the filter choke 21 of relatively low impedance and filter condenser 22 of relatively large capacity.

The tubes 11 and 12 are filled with xenon, argon or other inert gas, although mercury or other metallic vapor may be used. With tubes of this type, if a sufficient stream of electrons is emitted by the cathode, the gas will become ionized thereby and will become conductive and a main discharge between the cathode and plate takes place during the active period of the tube, that is, between each half cycle of the supply current when the plate is positive with respect to the cathode. During the blocking periods of the tubes when the plate is negative with respect to the cathode, no plate current will flow and, therefore, a uni-directional current only will be impressed upon the output terminals of the rectifier as load.

Grids 15 and 16 are used to control the starting points of the tubes during their active periods by impressing a proper potential upon the grid, thereby controlling the electron flow from the cathode and thus controlling the ionization of the gas necessary to induce the main discharge between plate and cathode. The means for impressing the proper potential upon the grid at the desired time are as follows. A sinusoidal or AC control voltage is generated by transformer secondary winding 24 which may be on the main supply transformer. Across the terminals of this secondary winding is connected a phase shift circuit consisting of resistance 25 and capacity 27. The value of the resistance and capacity is so chosen as to provide a control voltage across the terminals 28 and 29 of the phase shift circuit which will lag the main supply voltage by approximately 90 degrees. In the illustrative embodiment shown, with a 110 volt power supply, the capacity 27 is of the order of ½ microfarad, and the resistance 25 is of the order of 7500 ohms. The particular values will, of course, depend upon the various constants of, and potentials employed in, the circuit, and also upon the desired manner of operation of the rectifier. It will be understood that an inductance might be used instead of the capacity to provide the necessary degree of phase shift. A potentiometer 30, with slide 21, is connected across the output of the phase shift circuit 28 and 29. The output terminals of the phase shift circuit are also connected through grid resistors 32 and 33 to the grids 15 and 16 of the rectifier tubes.

By these means a fixed AC potential is imposed on the grids of the two tubes 11 and 12, the potential of each grid lagging the plate potential by a fixed amount and approximately 90 degrees. As the grid potential in each cycle becomes relatively more positive, the electrons emitted in the tubes increase until they cause ionization of a sufficient number of gas molecules to render the tube conducting, at which time the main discharge will start. This discharge will continue during the remainder of the positive half cycle or until the plate supply current again passes through zero, when the discharge will cease and the tube will remain inactive during the negative half cycle. Once the discharge occurs, the grid is no longer effective to control the remainder of that period, but on the next positive half cycle the grid will again function in the same manner to determine the time of starting.

The slide on the potentiometer 30 provides a point in the grid control circuit at which an auxiliary control potential may be connected so that such auxiliary potential is impressed upon the grids, in addition to the AC out-of-phase potentials. By variations of this auxiliary control potential, the tubes may be adjusted to fire at any point in the firing range of the tubes, which approaches the limits of zero and 180 degrees on the positive half cycle of the supply current, without shifting the phase of the out-of-phase potential. Furthermore, as is desirable in starting, the tube grids may be blocked by making the auxiliary control potential sufficiently negative so that the tubes will not be permitted to fire.

By means of the center tap 31 on potentiometer 30, the phase lag AC voltage is divided into two parts, 180 degrees out-of-phase with each other, and lagging their corresponding voltages of the two halves of the plate supply transformer winding. It is desirable to make center tap 31 adjustable for the purpose of exactly balancing the firing points of the two rectifier tubes to offset any variation in manufacture or assembly, for if the firing characteristics or grid potentials are not approximately the same then one or the other of the two tubes will conduct more current, and limit the combined capacity of the rectifier. As stated above, the center tap 31 also provides a single point at which an auxiliary grid potential may be introduced, in a manner hereinafter explained, for the purpose of advancing or retarding the firing points in each cycle. This auxiliary grid potential may be a DC voltage superimposed on the AC grid potential; in effect, to shift the axis of the AC grid voltage or, in other words, to give the AC grid voltage a positive or negative bias with reference to the cathode of the rectifiers.

Referring to Fig. 2, the axis of the AC grid voltage is shown displaced below or negative to the cathode potential, the effect being to shift the firing point of the rectifiers later in the cycle and causing the rectifiers to conduct current for a shorter time. In Fig. 3 the same AC plate supply and grid voltages are shown with the grid voltage axis shifted above or more positive with respect to the cathode potential. The effect then is to cause the tubes to fire earlier in the cycle and to conduct current for a comparatively large portion of the positive half cycle. It will be understood that the construction of the rectifier tubes is such that the tubes break down ant conduct current if the grid is raised to a potential substantially equal to cathode potential during the time that the plate anodes are going through the positive half cycle; that is, in the Figs. 2 and 3, the "trigger voltage" is taken to be approximately cathode potential although tubes with trigger voltages differing from cathode potential would function equally well.

Therefore, by varying the auxiliary plate potential, or superimposed DC grid bias, impressed on point 31 in the grid circuit, the firing point of the tubes may be varied, or if sufficient negative bias is applied, the tubes may be blocked or prevented from firing at all. The auxiliary circuits for blocking the grids until the cathodes are hot, and for automatically varying the DC grid bias in order to maintain the DC output voltage constant, will now be described.

A potentiometer 34 is connected across the rectifier output, the voltage of which is required to be maintained within predetermined limits. Slider 35 of the potentiometer 34 is connected to the + terminal of battery 36, which provides a source of reference potential that is substantially equal and in opposition to the no-load potential across that portion of the potentiometer 34 between slider 35 and the positive end of the potentiometer. The negative terminal of the battery is connected to grid 37 of a vacuum triode tube 38, the function of which is described later. The negative terminal of battery 36 is also connected to the break contact 39 of a relay 40. Relay 40 being normally in the unoperated position when AC power is first applied to the rectifier, break contact 39 is in contact with armature spring 41, which is connected to slider 31 of potentiometer 30.

A circuit can, therefore, be traced from cathodes 13 and 14 of rectifiers 11 and 12, through conductors 73—75, to potentiometer 34, slider 35, battery 36, contacts 39 and 41 of relay 40, slider 31 and potentiometer 30, resistances 32 and 33 to grids 15 and 16 of rectifiers 11 and 12. It will be noted that in this circuit there are two sources of potential, first the AC potentials across the two halves of potentiometer 30, and second the battery 36. In this circuit the voltage of battery 36 is of a value exceeding the peak value of the AC voltage wave across one-half of the potentiometer 30 and, therefore, the grids 15 and 16 are held negative with respect to cathodes 13 and 14, and the grid potential below the trigger voltage, the rectifiers 11 and 12 are prevented from firing during any part of the cycle.

The rectifiers continue to be blocked by negative grid potential until the cathodes have become heated sufficiently to prevent damage to their coatings by cold conduction. Thereafter, the grids are unblocked and transferred from negative battery potential to automatic control circuits by the combined action of relay 40 and a cam switch 43.

The operation of the relay and cam switch and relay will now be described. The cam switch 43 is operated by a self-starting AC motor 49 connected to the main power supply, the circuit including break contacts 44 and 45 on relay 40 in parallel with break contacts 46 and 47 operated by follower 48 on cam switch 43. The motor 49 is geared to cam 43 so that the cam makes one revolution in approximately twice the normal heating time of the cathodes of main rectifiers 11 and 12. The cam switch is provided with two followers 48 and 50 displaced around the circumference of the cam by approximately 180 degrees. The cam surface has one depression 43', giving each of the two followers one operation with a comparatively short dwell during each revolution. The operation of follower 50, and consequent closure of contacts 51 and 52, will, therefore, occur before the operation of follower 48 by approximately the heating time of the cathodes 13 and 14, the direction of rotation of the cam 43 being indicated by the arrow.

When the primary 19 of the power supply transformer 20 is energized, the motor 49 starts, being connected in parallel with the power supply, through contacts 44 and 45 of relay 40. Some time thereafter the cam depression allows follower 50 to operate and close contacts 50 and 52 of the cam switch. This causes relay 40 to operate and lock with current supplied by an auxiliary vacuum tube rectifier 53. The auxiliary rectifier 53 preferably is of the full wave type having cathodes 54 and 55 heated by a separate winding 56 on transformer 20, the conductors 77 and 78 of the winding being connected to terminals 77' and 78' of the filaments or heater elements 79 and 80 of the tube 53. The plate anodes 57 and 58 are in parallel with plates 17 and 18 of the main rectifier and are connected to the main transformer secondary. A separate filter condenser 59 connects the auxiliary cathodes 54 and 55 to the main cathode circuit, the purpose of which is to smooth out ripples in the output voltage of the auxiliary rectifier. As stated above, upon closure of contacts 51 and 52 of cam switch 53, DC current from the auxiliary rectifier flows over the circuit, condenser 59, conductor 60, contacts 52 and 51 of cam switch 43, winding of relay 40, and conductor 61, to the other side of condenser 59. The condenser 59 being maintained charged by the action of auxiliary rectifier 53, the relay 40 operates. Upon the operation of relay 40, its contacts 44 and 45 in the motor supply circuit open, the circuit being kept closed by the parallel contacts 46 and 47 of cam switch 43. Also, armature spring 41 of relay 40 is moved from break contact 39 to a make contact 62, thereby transferring the grid blocking circuit for negative battery through break contact 63, spring 80 controlled by the cam follower 48, contact 62 and armature contact 41 to slider 31 of potentiometer 30. Furthermore contacts 64 and 65 of relay 40 close, preparing a locking path for the relay. Therefore, as the relay operates the grid blocking circuit is maintained and the motor continues to revolve the cam 43. As follower 50 leaves the cam depression, contacts 51 and 52 reopen and relay 40 remains locked over the circuit, positive side of condenser 59, conductor 60, contacts 64 and 65 of relay 40, resistance 66, winding of relay 40, to conductor 61 and negative side of condenser 59.

As the cam 43 continues to revolve, cam follower 48 is engaged by the depression thereby opening contacts 46 and 47 and stopping the motor 49. At the same time cam follower 48 transfers the grid circuit from negative battery on contact 63 to make contact 67, thereby unblocking the grid and placing the grid circuit under automatic control of the output voltage of the main rectifier.

As described above, the slider 31 on potentiometer 30 provides a point whose potential represents the axis of the AC grid control voltage, and at this point, therefore, the auxiliary control voltage is applied to move the axis of the AC grid potential up or down; that is, towards the positive or negative with reference to the cathode or trigger potential of the main rectifiers 11 and 12. By this introduction of an auxiliary control voltage and the consequent shifting of the axis of the AC grid potential, the main rectifier tubes are caused to fire earlier or later in the cycle and thereby regulate the current passed by the rectifiers to balance the load current.

The variable DC potential for grid control is provided by the drop across a fixed resistance 68 which is in series with the plate circuit of amplifier triode 38. The heater elements 82 and 83 of the tube are connected at 73'' and 74'' to the conductors 73 and 74 of the heater supply winding 72 of the main transformer. The series regulating circuit is as follows: Positive side of condenser 59, conductor 60, contacts 64 and 65 of relay 40, resistance 68, conductor 69, plates 70 and 71 of vacuum tube amplifier 38, cathode 42, conductor 85, potentiometer 34 or load 23 to negative side of condenser 59. The positive end of this series circuit being connected to the auxiliary rectifier 53 and condenser 59 is maintained at a potential higher than that of the main rectifier cathodes 13 and 14, which may be explained by the fact that the auxiliary rectifier acts as a peak rectifier and the choke coil 21 develops an inductive potential higher than the transformer potential under heavy loads. While the values of the choke 21 and condenser 59 may be varied within wide limits, a choke having an inductance of the order of .0125 henry and a condenser having a capacity of the order of 4 microfarads have been found satisfactory. The series circuit includes the source of output potential of the main rectifier developed across the condenser 22 and load 23, which is a constant potential that is in opposition to the flow of current in the series circuit. It follows that by proper selection of the value of resistance 68 and regulating the current through the plate circuit of tube 38 by controlling the grid 37, the voltage drop through resistance 68 may be varied to give an auxiliary DC grid control potential to place the axis of the grid voltage more positive, or equal to, or more negative than the cathode or trigger potential. It may be noted that one end, the negative, of resistance 68 is connected through make contact 67, cam follower spring 64, contacts 62 and 41 of relay 40 to slider 31 which is the regulating point of the grids 15 and 16 of the main rectifier. Therefore, if the current passed by tube 38 is increased, the voltage drop through resistance 68 is increased and the potential of control point 31 is made more negative. As will be noted, grid 37 is connected to negative of the bucking battery 36, the positive end of the battery being connected to slider 35 of potentiometer 34. The slider 35 is normally adjusted so that grid 37 of tube 38 is maintained at a small negative potential with reference to cathode 42, this value also being such that the plate current is just sufficient to maintain the proper potential at control point 31.

If now the voltage across potentiometer 34 be momentarily decreased, grid 37 is immediately carried to a more negative potential with reference to cathode 42. Practically instantaneously the current in the plate circuit is decreased, the voltage drop through resistance 68 is decreased and control point 31, the axis of the AC grid potential, is carried to a more positive value. The result is that the main rectifier tubes 11 and 12 on the next and succeeding cycles fire earlier and pass more current tending to raise the average voltage of condenser 22, and thereby maintain or restore the voltage across potentiometer 34 to nearly its predetermined constant value.

The action of the control circuit thus automatically advances or retards the firing point of the main rectifier tubes so that the current passed by the tubes is increased or decreased with voltage drops at the DC output terminals due to fluctuations in load. Because of the amplifier action of tube 38 the voltage shift of the axis of AC grid control voltage is many times the amount of corresponding variations of output voltage and, therefore, the output voltage variation between no load and full load may be kept at a minimum, provided the drop in the rectifiers and supply circuits does not limit the maximum power available, to less than full load value.

If the power supply to the rectifier is interrupted even momentarily, condenser 59 rapidly loses its charge and relay 40 releases. This immediately places negative battery on control point 31 through its break contacts 39 and 41, blocking the main rectifier tubes as previously described. Relay 40 in releasing also closes its contacts 44 and 45, preparing the supply circuit of the synchronous motor 49 for restoration of power supply. The starting circuit is then in a condition to recycle and start the rectifier by unblocking the grids only after the heating time of the tubes has elapsed, as previously described.

The starting circuit is thus made automatically an instantaneously resetting, and furthermore provides a degree of supervision of the auxiliary rectifier, since relay 40 will not operate or remain locked in the absence of the auxiliary rectifier potential.

Should the grid control circuits fail, for example, by opens or short-circuits which leave the grids floating or with positive potential, the DC output voltage tends to rise to a value which might damage condenser 22 or load 23. This condition is prevented by relay 40, which may be adjusted to drop out if the positive (cathode) output potential raises to or above a predetermined value. It will be noted that the winding of relay 40 is connected to a circuit, one end of which is the positive side of condenser 59, the DC potential of which is substantially fixed by the AC voltage applied to the plates 57 and 58, this AC power supply being substantially constant under normal conditions of operation. The other end of the relay circuit is connected to the positive DC output of the main rectifier. Hence, the current in relay winding 40 is the result of the difference between the normally higher and fixed positive DC potential of the auxiliary rectifier and the positive potential of the DC output. If now the DC output potential of the rectifier increases, the current in the relay winding decreases and depending upon the adjustable mechanical load on the relay and the value of locking resistance 66, will release if the decrease is continued to a predetermined value. In this manner the relay serves as a protection against high voltage output of the rectifier.

Any variation in the voltage of the battery will be reflected in an almost proportional variation in the output voltage of the rectifier. It may be noted that normally the battery is connected to negative grids only and, therefore, the current drain on the battery is negligible, tending toward a long life with infrequent renewals required. Over a period of time the output voltage, if required, may be corrected manually within the regulating limits of tube 38 by slider 35 on rheostat 34.

It will be understood that the single phase, full wave rectifier has been shown by way of example only, and that half wave or three phase rectifiers may be controlled in a similar manner.

While there is shown and described herein a certain preferred embodiment of the invention, many other and varied forms and uses will present themselves to those versed in the art without departing from the invention, and the invention, therefore, is not limited except as indicated by the scope of the appended claims.

We claim:

1. An alternating current rectifier system comprising a gas filled grid controlled rectifier having main discharge anode and cathode electrodes and a control electrode, a source of alternating current supply connected to the rectifier input circuit, and control means for impressing upon the control electrode an alternating potential of the same frequency as, but out of phase with, the potential of said supply current, said control means also including means for impressing upon said control electrode an auxiliary potential, and means for varying the auxiliary potential to control the firing point of the rectifier during each active cycle thereof, said last named means comprising an impedance in the output circuit of the rectifier for producing a potential that varies with the rectifier output potential, a source of fixed reference potential connected in circuit with said impedance in opposition to the potential produced by said impedance and a thermionic tube having its grid circuit controlled by the impedance and source of fixed reference potential, means comprising a reactance in circuit with the main rectifier output circuit and an auxiliary rectifier in circuit with said reactance for applying to the plate circuit of said thermionic tube a potential invariably higher than the potential of the rectifier output circuit to increase the range of control and sensitivity of the rectifier control circuit, means including said thermionic tube for producing a potential that varies with the thermionic tube plate current, and means for impressing the last named potential on said rectifier control electrode.

2. An alternating current rectifier system comprising a gas filled grid controlled rectifier having main discharge anode and cathode electrodes and a control electrode, a source of alternating current supply connected to the rectifier input circuit, and control means for impressing upon the control electrode an alternating potential of the same frequency as, but out of phase with, the potential of said supply current, said control means also including means for impressing upon said control electrode an auxiliary potential, and means for varying the auxiliary potential to control the firing point of the rectifier during each active cycle thereof, said last named means comprising means in the output circuit of the rectifier for producing a potential that varies with the rectifier output potential, a source of direct current in circuit with said impedance and a thermionic tube having its grid circuit controlled by the impedance and source of direct current, an auxiliary rectifier having its anodes connected in multiple with the main discharge anode electrodes, a condenser in circuit with the auxiliary rectifier cathode circuit, and means including said auxiliary rectifier and condenser for applying to the plate circuit of the first named thermionic tube a potential invariably higher than the potential of the rectifier output circuit to increase the range of control and sensitivity of the rectifier control circuit, means including said thermionic tube for producing a potential that varies with the thermionic tube plate current, and means for impressing the last named potential on said rectifier control electrode.

3. An alternating current rectifier system comprising a gas filled grid controlled rectifier having main discharge anode and cathode electrodes and a control electrode, a source of alternating current supply connected to the rectifier input circuit, and control means for impressing upon the control electrode an alternating potential of the same frequency as, but out of phase with, the potential of said supply current, said control means also including means for impressing upon said control electrode an auxiliary potential, and means for varying the auxiliary potential to control the firing point of the rectifier during each active cycle thereof, said last named means comprising means in the output circuit of the rectifier for producing a potential that varies with the rectifier output potential, a source of direct current in circuit with said impedance and a thermionic tube having its grid circuit controlled by the impedance and source of direct current, means comprising an inductance in circuit with the main rectifier output circuit and an auxiliary rectifier and a condenser in circuit with said inductance for applying to the plate circuit of the first named thermionic tube a potential that varies with the rectifier output current, means including said thermionic tube for producing a potential that varies with the thermionic tube plate current, and means for impressing the last named potential on said rectifier control electrode.

4. An alternating current rectifier system comprising a gas filled grid controlled rectifier having main discharge anode and cathode electrodes and a control electrode, a source of alternating current supply connected to the rectifier input circuit, and control means for impressing upon the control electrode an alternating potential of the same frequency as, but out of phase with, the potential of said supply current, said control means also including means for impressing upon said control electrode an auxiliary potential, and means for varying the auxiliary potential to control the firing point of the rectifier during each active cycle thereof, said last named means comprising an impedance in the output circuit of the rectifier for producing a potential that varies with the rectifier output potential, a source of direct current in circuit with said impedance and a thermionic tube having its grid circuit controlled by the impedance and source of direct current, means comprising an auxiliary rectifier having its anodes connected in multiple with the main discharge anode electrodes and an inductance in circuit with the main rectifier output circuit and a condenser in circuit with the auxiliary rectifier cathode circuit for applying to the plate circuit of the first named thermionic tube a potential which varies with the main rectifier output current but invariably is higher than the potential of the main rectifier output to increase the range of control and sensitivity of the rectifier control circuit, means including said thermionic tube for producing a potential that varies with the thermionic tube plate current, and means for impressing the last named potential on said rectifier control electrode.

5. An alternating current rectifier system comprising a gas filled grid controlled rectifier having main discharge anode and cathode electrodes and a control electrode, a source of heating current for the cathode, a source of alternating current supply for the rectifier input circuit, and control means for impressing upon the control electrode an alternating potential of the same frequency as, but out of phase with, the potential of said supply current, said control means also including means for impressing upon said control electrode an auxiliary potential and means for varying the auxiliary potential to control the firing point of the rectifier during each active cycle thereof, a synchronous motor device and means for connecting the motor device to said source of alternating current to energize the device, cam structure controlled by said motor device, and means including circuit controlling contact members controlled by said cam structure for preventing the passing of current by the rectifier until its cathode is heated to its normal operating temperature.

6. An alternating current rectifier system comprising a gas filled grid controlled rectifier having main discharge anode and cathode electrodes and a control electrode, a source of heating current for the cathode, a source of alternating current supply for the rectifier input circuit, and control means for impressing upon the control electrode an alternating potential of the same frequency as, but out of phase with, the potential of said supply current, said control means also including means for impressing upon said control electrode an auxiliary potential and means for varying the auxiliary potential to control the firing point of the rectifier during each active cycle thereof, comprising means in the output circuit of the rectifier for producing a first potential that varies with the rectifier output potential, a source of reference potential in circuit with said last named means and having its potential substantially equal and in opposition to the potential produced by said means in the output circuit, means controlled by the resultant potential of said first potential and said reference potential, means including said last named means for producing a potential that varies with the thermionic tube plate current, means for impressing the last named potential on said rectifier control electrode, and means for utilizing said source of reference potential for blocking the grid of said rectifier until the cathode of the rectifier is heated to its normal operating temperature.

7. An alternating current rectifier system comprising a gas filled grid controlled rectifier having main discharge anode and cathode electrodes and a grid, a source of heating current for the cathode, a source of alternating current supply for the rectifier input circuit, and control means for impressing upon the grid an alternating potential of the same frequency as, but out of phase with, the potential of said supply current, said control means also including means for impressing upon said grid an auxiliary potential and means for varying the auxiliary potential to control the firing point of the rectifier during each active cycle thereof, and means for applying to said grid a negative potential sufficiently high to prevent the passing of current by the rectifier until the cathode is heated to its normal operating temperature.

8. An alternating current rectifier system comprising a gas filled grid controlled rectifier having main discharge anode and cathode electrodes and a control electrode, a source of alternating current supply for the rectifier input circuit, and control means for impressing upon the control electrode a voltage comprising an alternating potential of the same frequency as the potential of said supply current and a direct potential variable to control the output voltage, and means for varying said direct potential to control the firing point of the rectifier during each active cycle thereof, comprising a source of fixed reference potential, voltage divider means in the output circuit of the rectifier for producing a first potential substantially equal to and in opposition with said fixed reference potential, said first potential varying in accordance with the rectifier output potential, a thermionic tube having its grid circuit controlled by the resultant potential of said first potential and said reference potential, means including said thermionic tube for producing a potential that varies with the thermionic tube plate current, means for combining said last named potential with, and in opposition to, the rectifier output potential to produce a net potential which may be either negative or positive with respect to the main rectifier cathode depending upon the magnitude of the voltage drop in the main rectifier output circuit, and means for impressing said net potential on said rectifier control electrode.

9. An alternating current rectifier system comprising a gas filled grid controlled rectifier having main discharge anode and cathode electrodes and a control electrode, a source of alternating current supply for the rectifier input circuit, and control means for impressing upon the control electrode a voltage comprising an alternating potential of the same frequency as the potential of said supply current and a direct potential variable to control the output voltage, and means for varying said direct potential to control the firing point of the rectifier during each active cycle thereof, comprising a source of fixed reference potential, adjustable voltage divider means in the output circuit of the rectifier for producing a first potential substantially equal to and in opposition with said fixed reference potential, said first potential varying in accordance with the rectifier output potential, a thermionic tube having its grid circuit controlled by the resultant potential of said first potential and said reference potential, means including said thermionic tube for producing a potential that varies inversely with the thermionic tube plate current, means for combining said last named potential with, and in opposition to, the rectifier output potential to produce a net potential which may be either negative or positive with respect to the main rectifier cathode depending upon the magnitude of the voltage drop in the main rectifier output circuit, and means for impressing said net potential on said rectifier control electrode.

10. In the art of gas filled grid controlled rectifiers of alternating current, means for regulating the firing point of the rectifier during each active cycle by variation of a reversible D. C. component superposed on the A. C. voltage applied to the control grid comprising adjustable means in the output circuit of the rectifier for producing potential that varies with the rectifier output potential, a source of fixed reference potential in circuit with said adjustable means and having its potential substantially equal and in opposition to the potential produced by said adjustable means, a thermionic tube having its grid circuit controlled by the resultant potential of said first potential and said reference potential, and means for combining the voltage drop across said thermionic tube with the output voltage of the rectifier for producing the said reversible D. C. component superposed on the A. C. control grid voltage.

MERTON L. HASELTON.
HAROLD F. MAY.